Figure 1:
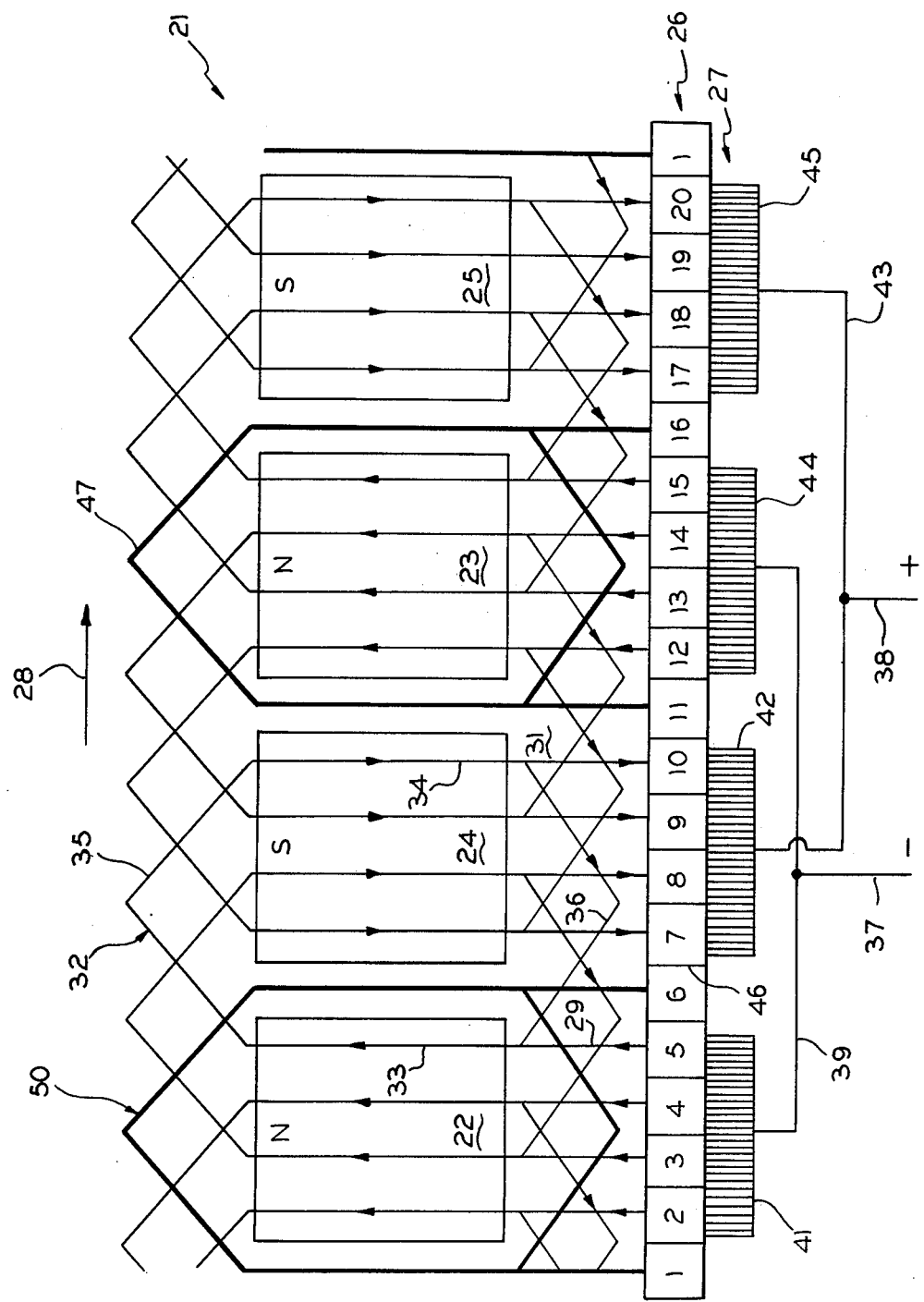

United States Patent [19]

Kropp et al.

[11] Patent Number: 4,459,503

[45] Date of Patent: Jul. 10, 1984

[54] DIRECT-CURRENT ELECTRICAL MOTORS AND GENERATORS

[76] Inventors: Lev D. Kropp, 2178 W. Marne Ave., Milwaukee, Wis. 53209; Abram G. Rabin, Moscow, U.S.S.R.

[21] Appl. No.: 340,380

[22] Filed: Jan. 18, 1982
(Under 37 CFR 1.47)

Related U.S. Application Data

[63] Continuation of Ser. No. 121,675, Feb. 15, 1980, abandoned.

[51] Int. Cl.³ .............................................. H02K 3/00
[52] U.S. Cl. .................................... 310/198; 310/148; 310/234
[58] Field of Search .......................... 310/198–209, 310/180, 184, 222–226, 148–151, 234, 154, 46, 177, 248, 249

[56] References Cited

U.S. PATENT DOCUMENTS

| | | | |
|---|---|---|---|
| 1,123,161 | 12/1914 | Andrews | 310/200 |
| 2,590,298 | 3/1952 | Delastre | 310/224 |
| 2,668,926 | 2/1954 | Johnson | 310/225 |
| 3,535,573 | 10/1970 | Appleton | 310/234 |
| 3,733,506 | 5/1973 | Jaffe | 310/223 |
| 4,107,587 | 8/1978 | Ban | 310/202 |
| 4,227,107 | 10/1980 | Ban | 310/198 |
| 4,243,902 | 1/1981 | Ban | 310/154 |

Primary Examiner—R. Skudy
Attorney, Agent, or Firm—Dick and Harris

[57] ABSTRACT

An improved direct-current electrical dynamotor wherein the brushes are sufficiently wide to simultaneously abut a multiplicity of commutator segments. The winding sections extend independently from one commutator segment to a commutator segment that is approximately 180 electrical degrees away whereby the brushes each simultaneously collect a plurality of currents induced in the winding sections extending to the commutator segments abutted by the pair of positive and negative brushes. Each pair of brushes is installed on each side of the magnetic neutral. All of the coil sections are completely independent of each other with no electrical interconnections aside from the commutator brushes.

7 Claims, 2 Drawing Figures

DIRECT-CURRENT ELECTRICAL MOTORS AND GENERATORS

This application is a Continuation Application of my earlier copending parent application, Ser. No. 121,675, filed Feb. 15, 1980, which has now been abandoned.

This invention relates to direct-current machines; and, more particularly, to arrangements of the windings, commutators and brushes of direct-current electrical motors and generators.

Conventional direct-current electrical motors include a stator providing magnetic poles and a rotor having coil windings thereon attached to commutator segments. In the generator mode, brushes are used for obtaining and rectifying the current generated when the windings cut the magnetic fields of force provided by the magnetic poles. In the electrical motor mode, the brushes are used to provide electrical current through the windings of the rotor to thereby cause the rotor to be forced into rotation by the magnetic field generated by the stator poles.

In the prior art dynamos, the sections of the rotor windings are sequentially connected in one of several ways, to one another and to the segments of the commutator. The brushes are generally the width of one or two commutator segments or only slightly wider than two commutator segments. The windings, commutator and brushes are arranged so that brushes 180 electrical degrees apart are simultaneously in contact with commutator segments that each couple to a plurality of winding sections. The number of parallel branches of winding in such conventional devices is approximately equal to the number of pole divisions.

In such conventional motors, therefore, each of the winding sections carries all of the current generated by a pair of poles. Thus, the wires of the winding have a relatively large diameter. In addition, with the large current flowing in the individual commutator segments and between the brushes and the commutator segments, the segments must have a large cross section. There is, therefore, formed heavy commutation conditions resulting in a great deal of inherent sparking which accelerates the erosion of both the commutator segments and brushes. Thus, the conventional direct-current machines have increased weight because of the requirement for larger commutator diameter and length and have decreased reliability because of the sparking generated with the normal winding, commutator and brush arrangement. There is, additionally, a certain limit in conventional dynamo's capacity due to the heavy commutation conditions.

Accordingly, it is an object of the present invention to provide new and unique direct-current electrical machines.

Another object of the present invention is to provide electrical machines using smaller cross-section commutator segments and smaller diameter wire in the rotor winding per given output.

Yet, another object of the present invention is to provide more reliable electrical machines.

Still another object of the present invention is to raise the efficiency and capacity limit of electrical machines.

A related object of the present invention is to provide electrical machines that require less copper and that weigh considerably less and are of a smaller size while providing the same power output as provided by conventional electrical machines.

In a preferred embodiment of the present invention, a dynamo uses an open winding consisting of a plurality of independent coil sections in a number essentially more than the number of pole divisions. Since the coil sections are independent, each section is intended to conduct only the current induced inside of its coil. The coil ends are connected, respectively, to a single originating and single terminating commutator segment which are approximately 180 electrical degrees apart. The commutator segments are embodied by brushes in a number equal to at least double the number of pole divisions. The brush width is equal to about one to two commutator segments less than the number of segments forming 180 electrical degrees. The width of the brush is sufficient to extend over the number of commutator segments beneath each of the poles to short circuit all of those segments. Each one of said pair of brushes is installed on each side of the magnetic neutrals. Additionally, all of the coil sections are completely independent of one another with no electric interconnection therebetween other than at the commutator brushes.

Figure 2:
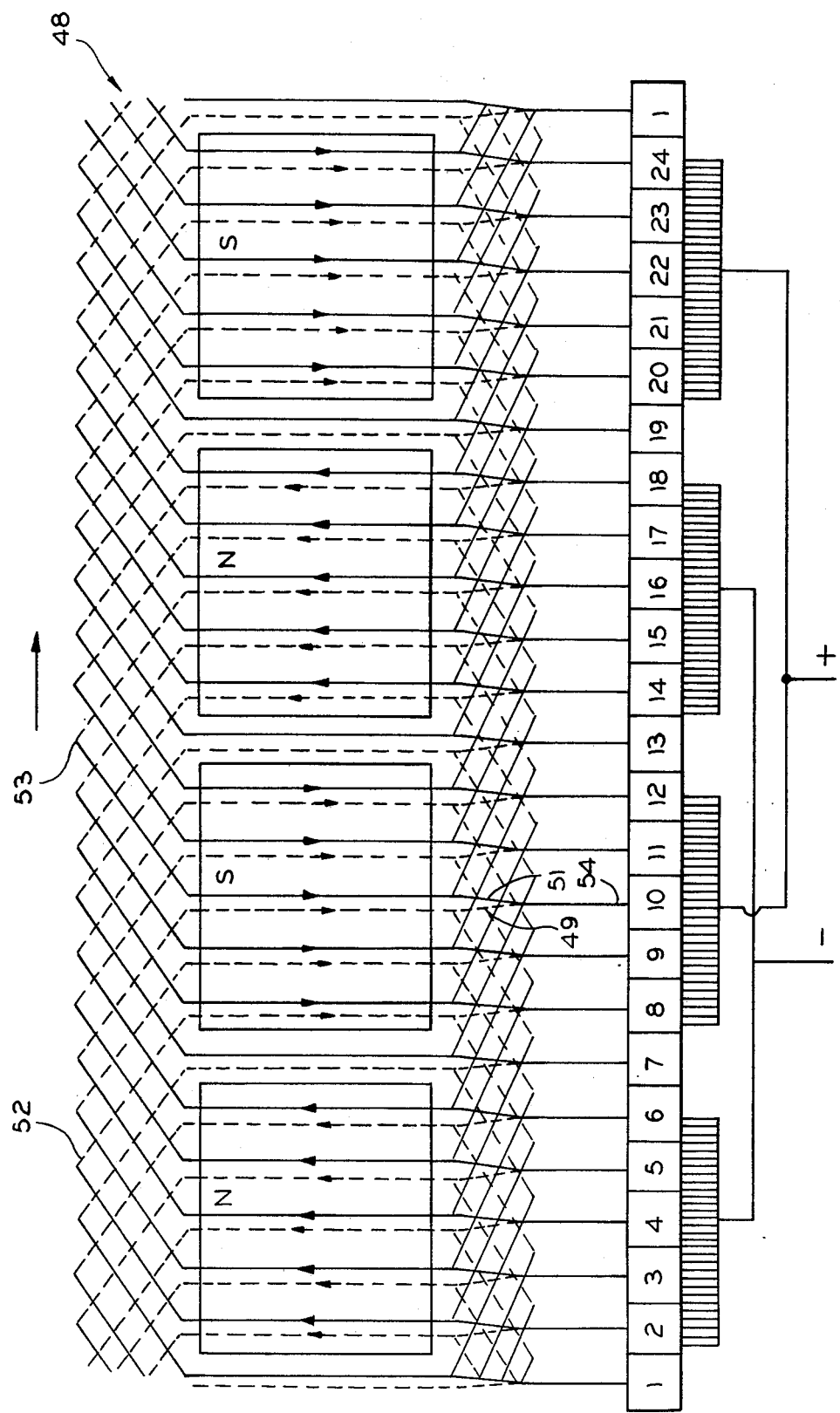
Figure 1:
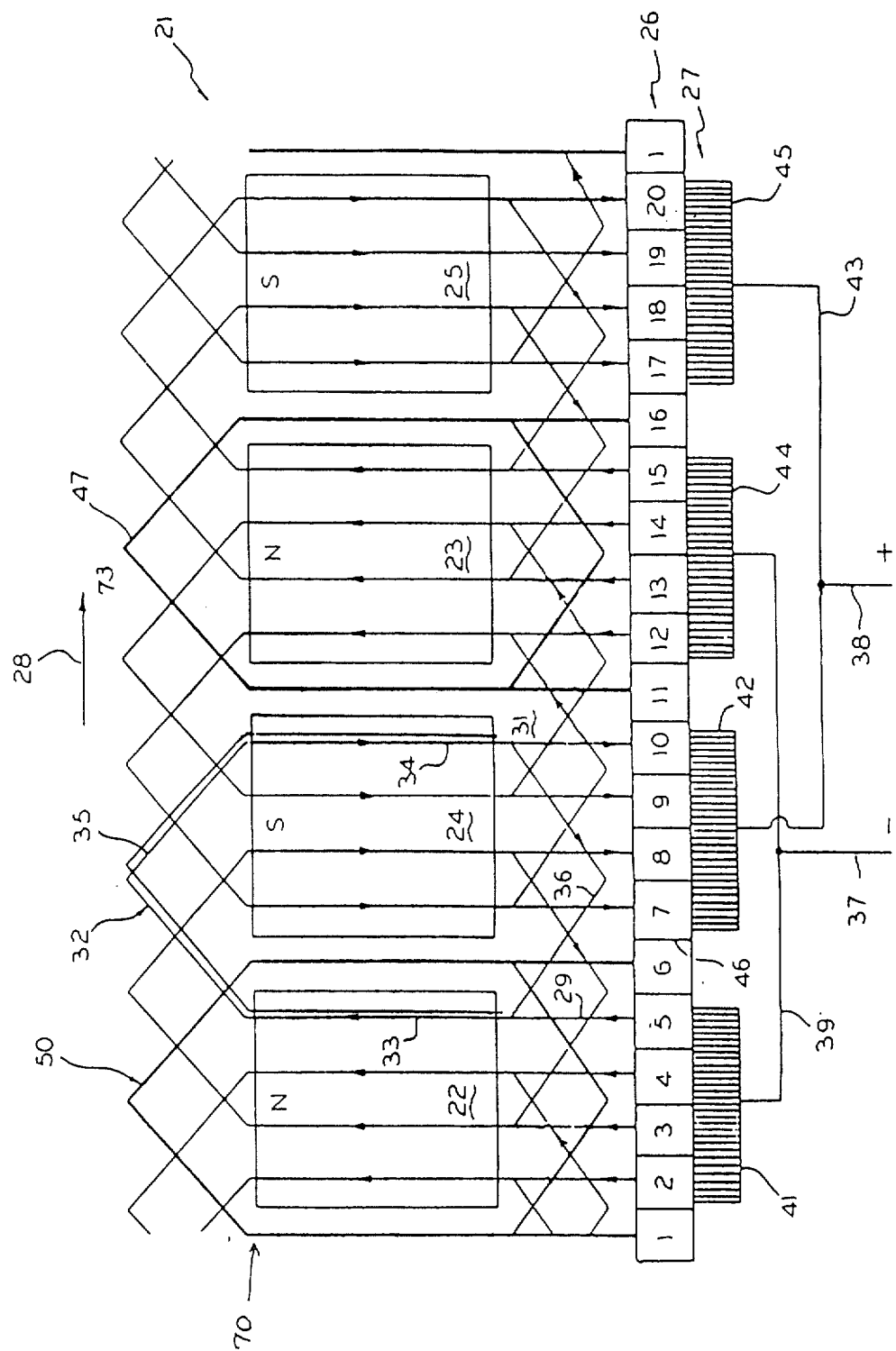

These and other objects and features of the present invention will be best understood by making reference to the accompanying copy of the drawings, wherein:

FIG. 1 is a developed view of a preferred embodiment of the winding and commutator arrangement for direct-current dynamos wherein the dynamo is wound in one layer; and FIG. 2 is a developed view of a preferred embodiment of the dynamo which is wound in two layers.

In the developed view of the direct current electrical machine or dynamo 21 of FIG. 1, the invention is shown as having an armature with open circuit windings 50 and a stator 70 comprising a plurality of poles 22 through 25 in which poles 22 and 23 are north poles and poles 24 and 25 are south poles. The commutator 26 is shown as comprising twenty segments or bars 1 through 20. Four commutator brushes 41, 42, 44 and 45 are also shown.

The open-circuit windings 50 are connected to the commutator bars 1 through 20 in a simplex fashion. It should be understood that multiple turns could be used on the coil within the scope of this invention.

As the armature rotates in the direction of the arrow 28, currents are induced in the inductors in the directions indicated by the arrows on the inductors as shown by inductor portion 33. Consider, for example, a section which extends from commutator bar 5 to commutator bar 10. That section comprises conductor 29 from commutator bar 5, conductor 31 connected to commutator bar 10 and coil 32, each turn of which is created by inductor 33 passing under the north pole, inductor 34, passing under the south pole, the back part 35 and a front part 36. The current flows from bar 5 through conductor 29, described coil 32, conductor 31 to bar 10. The induced current by the south pole 24 in a bunch of inductors 33 reinforces the current induced by north pole 22 in a bunch of inductors 34.

In the case of a generator, a circuit is completed by a load connected across negative conductor 37 and positive conductor 38. In the case of a motor, an external power source is coupled across conductors 37 and 38.

Conductor 37 is connected to a negative bus 39 which is connected to the negative brushes 41 and 44. The negative brushes 41 and 44 are positioned electrically under the north poles. Similarly, positive conductor 38 is connected to the positive bus 43 which is connected to the positive brushes 42 and 45. The positive brushes, 42-45 are positioned electrically below the south poles.

Referring to FIG. 1, conductor 29 emanates from single originating segment 5 and returns by way of conductor-34 to single terminating segment 10. In the present construction, segments 5 and 10 communicate with independent brushes 41 and 42, of opposite polarity and at positions 180 electrical degrees apart, respectively. The brushes respectively communicate with most if not all the segments under a given pole, such as segments 2 through 5 abutting brush 41 under pole 22, wherein brush 41 is electrically integrated with any other brushes 360 electrical degrees apart therefrom, such as brush 44.

As shown in FIG. 1, the inner pitch between the winding section inductors is equal to five slots. The pole pitch is also equal to five slots. The commutator pitch (the distance between two commutator segments of the same section) is also five slots, and the brushes are sufficiently wide to short the commutator segments beneath each of the poles. As shown in FIG. 1, each of the sections includes a single originating commutator segment such as originating segment 5 connected to inductor 29, which terminates at segment 10. The commutator segments are insulated from each other by mica strips, or other appropriate insulation means, such as the mica strip indicated at 46.

In the embodiment of FIG. 1, each of the inductors such as inductors 33 and 34 is intended to carry only the current induced in the coil of that section, since there is no electrical inter connection between the sections. The brushes, however, collect current from each of the sections connected to the bars abutted by the brushes. Thus, the current collected by each of the brushes is the sum of the currents produced individually by four different coils—the coils that are being cut by the lines of force from the opposite north and south poles. The smaller current carried by the individual inductors enables the use of a smaller gauge wire.

Since, however, the smaller current in the coils causes the smaller electrimotive force (e.m.f.), it is necessary to restore the capacity of the dynamo by raising the e.m.f. of each in all coils. Regarding the example of FIG. 1, the number of turns in each coil must be increased five times, because of the number of parallel sections is five times more than the number of pole pairs. Mathematically, the factor of increase equals the number of sections divided by the number of pole pairs or 10 divided by 2, respectively, equalling 5.

In the example of FIG. 1, the cross section of the wire for the conductors from the commutator bars to the section coils and the cross section of the bars themselves can be five times reduced. In actual application, that reduction is quite substantial. As a result, the copper consumption, the weight and the sizes of the dynamo can be significantly cut.

In addition, since each of the commutator bars carries a smaller current, i.e. the current that must have been torn in the commutation process, there is less sparking and less commutator and brush wear than found in the prior art dynamos. This permits an increase in the capacity limit for such direct-current machines.

In conventional dynamos, the rupture of the contact between the commutator segment and the brush (i.e. the commutation process) takes place with a full current. Change of a current direction in a certain section takes place when the section is short circuited by the brush abutting both commutator segments attached to the ends of the section. Presence of the shortly closed sections somewhat lowers the efficiency of such conventional dynamos.

The dynamo of the present invention has no shortly closed sections. The change of the direction of current takes place when the corresponding section's commutator segments are in the interval between two brushes of opposite polarity, as clearly shown by FIG. 1 where said section 47 is emphasized by the bold line. Therefore, the commutation process takes place with a slight current. This, additionally, increases the reliability of the dynamo and simplifies its operation.

As previously mentioned, more than one layer of winding can be used as shown by FIG. 2 which comprises another embodiment of the present invention with the more common two layer winding 48. In each section of that winding, one side of a coil is on the upper layer in an armature slot while the other side is put on the bottom of the slot. The winding has no significant distinctions from that described above. The two conductors 49 and 51 of different sections 52 and 53 are connected together into one conductor 54 which is coupled to a segment 10 for the purpose of reducing the number of the commutator segments. In some cases, however, it may be useful not to connect together section ends and have twice as many commutator segments.

By analogy, this can be accomplished through a multiplicity of layer windings. Additionally, it is contemplated that the present invention is not limited to a specific commutator-brush arrangement but rather is usable in both a drum and/or disk-type commutator-brush configuration.

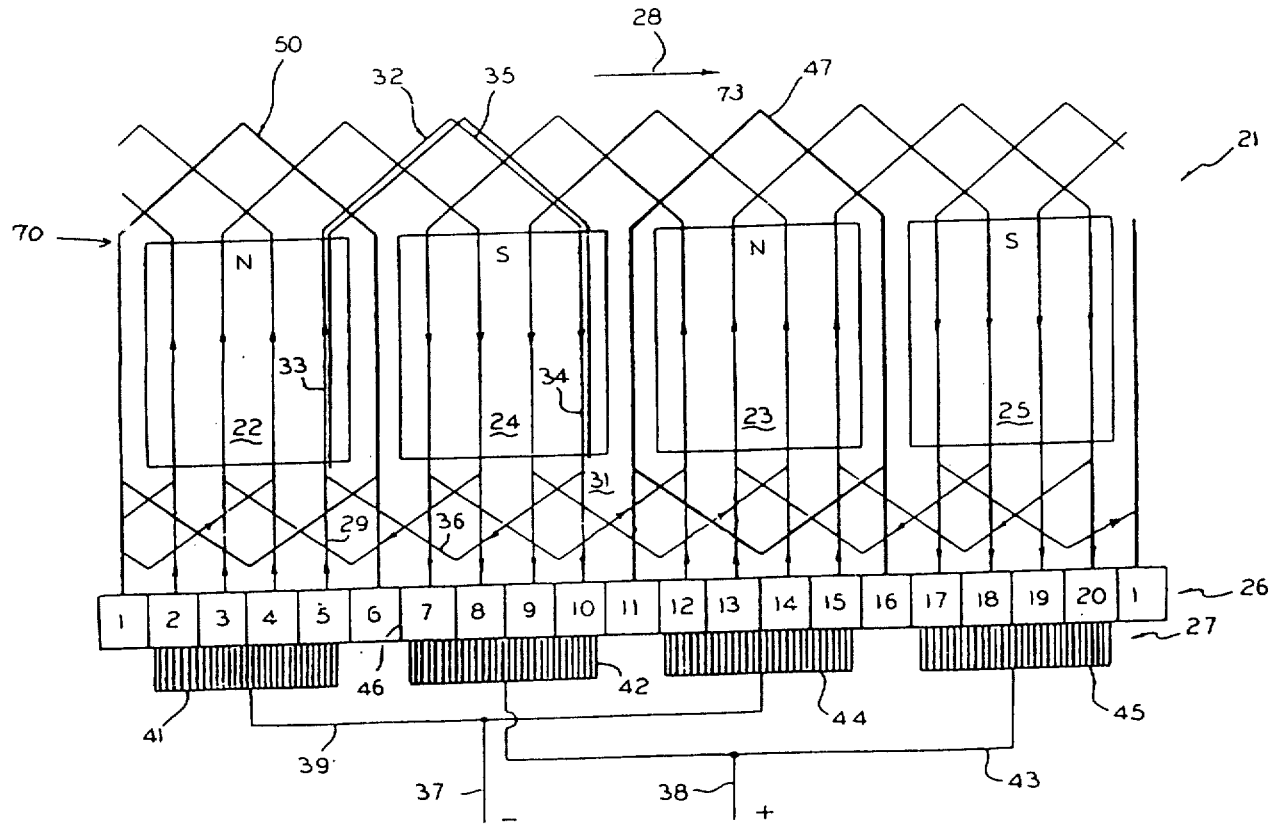

What is claimed is:

1. A direct current dynamo, said dynamo comprising;
a stator with a plurality of poles, the number of which poles is determined by a number of pole divisions,
an armature having an open winding thereon,
said winding consisting of a plurality of parallel coil sections which number is essentially more than said number of pole divisions;
a plurality of commutator brushes positioned for electrical cooperation with said plurality of coil sections,
each of said coil sections emanating from a single originating segment to a single terminating commutator segment connected to said winding,
each said respective single originating and single terminating commutator segment in each said coil section electrically communicating with independent ones of said plurality of brushes at respective commutator positions substantially 180 electrical degrees apart, any brushes substantially 360 electrical degrees apart from one another being electrically joined in parallel;
each of said coil sections further being completely independent of each other and having no electrical interconnections, other than at said commutator brushes so as to conduct primarily only the current as is induced inside of the respective coil of each,
said plurality of brushes abutting said commutator segments with the number of pairs of said brushes equal to the number of pole divisions,
each of said pair of brushes being positioned in operative electrical alignment with respective ones of said poles, and each of said plurality of brushes further in operable electrical contact with the majority of said commutator segments aligned under said respective pole.

2. The dynamo of claim 1 wherein each of said brushes is of sufficient width so as to interconnect together all the commutator segments attached to the coil sections under said respective individual corresponding pole.

3. The dynamo of claim 1 wherein said plurality of commutator brushes are arranged so that the commutator segments emerging under one pole position from an adjacent pole position as said armature rotates, do not simultaneously touch a single brush.

4. The dynamo of claim 3 wherein said winding consists of two or more layers of coil sections, the outer ends of which extend from a position on said armature, said ends being connected to the corresponding commutator segment.

5. The dynamo of claim 1 in which each coil is formed by turns, respective inductors of which are placed in slots which are substantially 180 electrical degrees apart.

6. The dynamo of claim 2 in which one or more of said respective brushes are of a width equal to the width of the segments under one pole, less one segment, to connect all the respective segments under a respective one of said plurality of poles.

7. The dynamo of claim 1 in which one or more of said respective brushes are of a width equal to the width of the segments under one pole, less two segments, to connect the majority of segments under a respective one of said plurality of poles.

* * * * *

UNITED STATES PATENT AND TRADEMARK OFFICE
CERTIFICATE OF CORRECTION

PATENT NO. : 4,459,503

DATED : July 10, 1984

INVENTOR(S) : Lev D. Kropp et al.

It is certified that error appears in the above-identified patent and that said Letters Patent is hereby corrected as shown below:

The title page should be deleted to appear as per attached title page.

The sheet of drawing consisting of Fig. 1 should be deleted and the attached sheet showing Fig. 1 substituted therefor.

Signed and Sealed this

Eighth Day of January 1985

[SEAL]

Attest:

Attesting Officer

GERALD J. MOSSINGHOFF

Commissioner of Patents and Trademarks

United States Patent [19]

Kropp et al.

[11] Patent Number: 4,459,503
[45] Date of Patent: Jul. 10, 1984

[54] DIRECT-CURRENT ELECTRICAL MOTORS AND GENERATORS

[76] Inventors: Lev D. Kropp, 2178 W. Marne Ave., Milwaukee, Wis. 53209; Abram G. Rabin, Moscow, U.S.S.R.

[21] Appl. No.: 340,380

[22] Filed: Jan. 18, 1982
(Under 37 CFR 1.47)

Related U.S. Application Data

[63] Continuation of Ser. No. 121,675, Feb. 15, 1980, abandoned.

[51] Int. Cl.³ .................................................. H02K 3/00
[52] U.S. Cl. .................................. 310/198; 310/148; 310/234
[58] Field of Search ............................. 310/198–209, 310/180, 184, 222–226, 148–151, 234, 154, 46, 177, 248, 249

[56] References Cited

U.S. PATENT DOCUMENTS

| | | | |
|---|---|---|---|
| 1,123,161 | 12/1914 | Andrews | 310/200 |
| 2,590,298 | 3/1952 | Delastre | 310/224 |
| 2,668,926 | 2/1954 | Johnson | 310/225 |
| 3,535,573 | 10/1970 | Appleton | 310/234 |
| 3,733,506 | 5/1973 | Jaffe | 310/223 |
| 4,107,587 | 8/1978 | Ban | 310/202 |
| 4,227,107 | 10/1980 | Ban | 310/198 |
| 4,243,902 | 1/1981 | Ban | 310/154 |

Primary Examiner—R. Skudy
Attorney, Agent, or Firm—Dick and Harris

[57] ABSTRACT

An improved direct-current electrical dynamotor wherein the brushes are sufficiently wide to simultaneously abut a multiplicity of commutator segments. The winding sections extend independently from one commutator segment to a commutator segment that is approximately 180 electrical degrees away whereby the brushes each simultaneously collect a plurality of currents induced in the winding sections extending to the commutator segments abutted by the pair of positive and negative brushes. Each pair of brushes is installed on each side of the magnetic neutral. All of the coil sections are completely independent of each other with no electrical interconnections aside from the commutator brushes.

7 Claims, 2 Drawing Figures